United States Patent [19]
Goto

[11] Patent Number: 5,845,159
[45] Date of Patent: Dec. 1, 1998

[54] OPTICAL APPARATUS

[75] Inventor: Hisashi Goto, Yokohama, Japan

[73] Assignee: Olympus Optical Co., Ltd., Tokyo, Japan

[21] Appl. No.: 794,989

[22] Filed: Feb. 5, 1997

[30] Foreign Application Priority Data

Feb. 6, 1996 [JP] Japan .................................. 8-020103

[51] Int. Cl.$^6$ .................................................. G03B 13/36
[52] U.S. Cl. .......................................................... 396/97
[58] Field of Search ............................ 396/97; 348/164, 348/362, 297, 363, 364

[56] References Cited

U.S. PATENT DOCUMENTS

| | | | |
|---|---|---|---|
| 4,163,602 | 8/1979 | Schutz et al. ............................ | 348/164 |
| 4,787,724 | 11/1988 | Kudo et al. . | |
| 4,828,383 | 5/1989 | Kunishige et al. ...................... | 396/106 |
| 4,992,855 | 2/1991 | Takei ................... | 348/297 X |
| 5,054,897 | 10/1991 | Ozawa ................... | 359/691 |
| 5,144,356 | 9/1992 | Kurbitz et al. ........................... | 396/97 |
| 5,194,956 | 3/1993 | Iwamoto ............................ | 348/364 X |
| 5,278,699 | 1/1994 | Ito et al. .................................. | 359/692 |
| 5,424,871 | 6/1995 | Ito et al. .................................. | 359/689 |

*Primary Examiner*—W. B. Perkey
*Attorney, Agent, or Firm*—Pillsbury Madison & Sutro LLP

[57] ABSTRACT

An optical apparatus has an imaging optical system including an optical element system which undergoes changes in shape and refractive index by temperature or humidity. This optical apparatus is provided with at least one set of a light-emitting element and a light-receiving element so that a beam of light emitted from the light-emitting element is received by said light-receiving element, and has a function of presuming a shift of an imaging position caused by the changes in shape and refractive index of the imaging optical system from an output of the light-receiving element.

9 Claims, 4 Drawing Sheets

OPTICAL APPARATUS

BACKGROUND OF THE INVENTION

1. Field of the Invention

This invention relates to an optical apparatus having an optical system for cameras or film scanners which includes an optical element system for which synthetic resin is used as material.

2. Description of Related Art

In recent years, optical apparatuses, such as cameras, which have an imaging optical system that includes an optical element system constructed of synthetic resin have been in demand. Synthetic resin, compared with glass, is not only inexpensive, but lightweight and easy to shape. The feature of synthetic resin that it is easy to shape facilitates the configuration of an aspherical lens and the improvement of imaging performance of an optical system. Optical element systems constructed of synthetic resin are available in a single lens type in which a lens element is used alone and a compound lens type in which a lens element comes in close contact with a glass lens.

Such a synthetic resin lens, however, has the drawback that its shape and refractive index change with temperature or humidity and thus, in particular, its imaging position is shifted. In order to meet this problem, a technique is proposed that a change in temperature is determined by variation in electric resistance to thereby correct the shift of the imaging position. Another technique is also proposed that the shift of the imaging position caused by a temperature or humidity change is minimized by a lens design in such a way that the refracting power of the synthetic resin lens is lessened or at least two synthetic resin lenses are used and their refracting powers are set to minimize the shift of the imaging position due to the temperature or humidity change in the entire optical system.

Moreover, a so-called TTL type focus detecting system is available that a beam of light coming from an object, after traversing an imaging optical system, is made incident on a light-receiving element, and thereby the imaging position is detected, including the shift of the imaging position attributable to the temperature or humidity change.

The first technique, mentioned above, of determining the temperature change by the variation of electric resistance has the following problems. Since the time required for the change in shape or refractive index of the synthetic resin lens is short compared with that required for a change in ambient temperature or humidity, the shift of the imaging position cannot be correctly predicted even though the ambient temperature or humidity is measured. Moreover, there is no means which can be incorporated in a camera to measure the change of humidity readily and inexpensively.

The second technique of minimizing the shift of the imaging position is attended with the following problems. Because the shift of the imaging position due to the temperature or humidity change is minimized, the number of degrees of freedom for setting the refractive index of the synthetic resin lens is highly limited and an effective design cannot be prepared. For the use of at least two synthetic resin lenses, two or more kinds of synthetic resin are in general used to correct for chromatic aberration. In this case, however, the reaction of synthetic resin to the change of temperature or humidity varies with the kind of synthetic resin, and hence it cannot be ensured that the shift of the imaging position due to the temperature or humidity change is always minimized. General properties of the synthetic resin lens are that when the temperature is changed, for example, raised, the size of the lens with the radius of curvature, thickness, etc., is increased and the refractive index is reduced. On the other hand, when the humidity is changed, for example, elevated, the size of the lens with the radius of curvature, thickness, etc., is increased and the refractive index is also increased. In other words, it is extremely difficult for the shift of the imaging position caused by either the temperature or humidity change to be kept to a minimum.

The TTL type focus detecting system of detecting the imaging position, by contrast, allows the above problems to be solved. This system, however, is such that a beam of light from an object is used and thus the amount and distribution of light changes with objects. Consequently, the system requires expensive light-receiving element arrays; beam splitting or switching means relative to a photographing optical system; highly precise, complicated reimaging optical systems for focus detection located behind the photographing optical system; and a signal processing circuit of high degree. This arrangement renders the system disadvantageous with respect to cost and body size. Furthermore, since an image equivalent to that formed on a film is required, it is difficult to apply the system to the so-called lens shutter camera in which an aperture stop and a shutter are integrally constructed (which is hereinafter referred to as a sector). That is, the system, although applicable to a single-lens reflex camera, is unsuitable for the lens shutter camera which is relatively inexpensive and compact.

SUMMARY OF THE INVENTION

It is, therefore, an object of the present invention to provide an optical apparatus which is capable of readily accommodating changes in the shape and refractive index of the synthetic resin lens by temperature or humidity to correct the shift of the imaging position.

In order to achieve this object, according to one aspect of the present invention, the optical apparatus is provided with an imaging optical system including an optical element system which undergoes changes in shape and refractive index by temperature or humidity. This optical apparatus has a light-emitting element and a light-receiving element which make at least one combination set so that a beam of light emitted from the light-emitting element is received by the light-receiving element, and retains the function of predicting the shift of the imaging position caused by an optical change of the imaging optical system from the output of the light-receiving element.

According to another aspect of the present invention, the optical apparatus is provided with a photographing optical system including an optical element system which undergoes changes in shape and refractive index by variation of temperature or humidity, and has a light-emitting element and a light-receiving element which make at least one combination set. The light-emitting element is placed so that a beam of light emitted therefrom is transmitted through at least one part of the photographing optical system and is received by the light-receiving element. This optical apparatus is a camera which has means for processing the output of the light-receiving element and a mechanism for compensating the shift of the imaging position due to an optical change of the photographing optical system by the output of the processing means.

According to still another aspect of the present invention, the optical apparatus has means for blocking visible light and transmitting infrared light as well as means for allowing the passage of visible light on the optical path of a photographing optical system by a necessary amount during exposure.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Figure 1A:
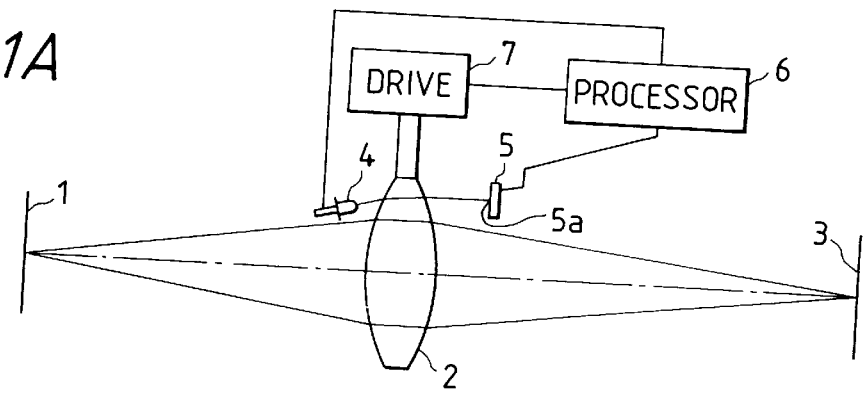
FIG. 1A is a view showing the arrangement of the optical apparatus, placed under reference temperature or humidity, of a first embodiment in the present invention.

Before undertaking the description of the embodiments, it will be expedient to explain the function of the optical apparatus according to the present invention.

The optical apparatus according to the present invention is provided with an imaging optical system including an optical element system which undergoes changes in shape and refractive index by variation of temperature or humidity, and has a light-emitting element and a light-receiving element which make at least one combination set. The light-emitting element is disposed so that a beam of light emitted therefrom is transmitted through at least one part of the imaging optical system and is received by the light-receiving element. Thus, the optical apparatus has the function of predicting the shift of the imaging position due to the optical change of the imaging optical system from the output of the light-receiving element.

Here, when the variation of temperature or humidity brings about changes in the shape and refractive index of the optical element system and therefore a change in the focal length thereof, the light beam emitted from the light-emitting element is such that its refracting action is altered by the optical element system whose shape and refractive index change with the variation of temperature or humidity. This causes a change in the state of incidence of the light beam on the light-receiving element. By processing the output of the light-receiving element for this change of incidence, it is possible to presume the imaging position relative to the object point of the imaging optical system. According to the present invention, since the shift of the imaging position can be presumed from the optical change of the optical element system itself, a change by humidity can be taken into account, in addition to the technique of using a thermometer, and it is not necessary to follow the optical change of the optical element system in accordance with variation in ambient temperature or humidity. Moreover, compared with the technique of correcting the shift of the Imaging position by an optical design, provisions are made for increasing the number of degrees of freedom of optical design and facilitating the design of high performance, good specification, low cost, etc. Since the influences of temperature and humidity are both evaluated, the distinction between the influences of the temperature and humidity on the optical element system need not be considered in particular for design.

Synthetic resin may be used as the material of the optical element system which undergoes changes in shape and refractive index by variation of temperature or humidity. The change in the state of incidence of the light beam emitted from the light-emitting element on the light-receiving element, caused by undergoing the change of the refracting action through the optical element system, may be considered as the shift of the position of incidence of the light beam on the light-receiving element. Alternatively, it may also be considered as a change in size of the light beam on the light-receiving element, a change in intensity of the light beam on the light-receiving element, or a combination of these changes.

The camera to which the optical apparatus of the present invention is applied has an imaging optical system including an optical element system which undergoes changes in shape and refractive index by variation of temperature or humidity, and is provided with a light-emitting element and a light-receiving element which make at least one combination set. The light-emitting element is disposed so that a beam of light emitted therefrom is transmitted through at least one part of the imaging optical system and is received by the light-receiving element. Thus, the camera has a mechanism for predicting and compensating the shift of the imaging position attributable to changes in shape and refractive index of the imaging optical system from the output of the light-receiving element. Means for predicting and compensating the shift of the imaging position are as described above.

The camera according to the present invention, in contrast with the conventional system in which the light beam from the object is passed through the imaging optical system and is made incident on the light-receiving element to detect the imaging position in accordance with variation in temperature or humidity, uses means for predicting the shift of the imaging position from temperature or humidity in a camera system, and thus does not require the secondary image formation, achieving ease of assembly including adjustments, cost reduction, and compactness.

In the case where the optical apparatus of the present invention is applied to the camera, it is necessary to fulfil the requirements that the light beam emitted from the light emitting-element and incoming light, except for photographic exposure, do not fall on a film (which are hereinafter referred to as "light-blocking requirements").

Hence, in the camera in which the shutter mechanism such as that of the so-called focal plane shutter is interposed between the photographic lens system and the film, it is only necessary that the optical path for measurement along which the light beam emitted from the light-emitting element is transmitted through the photographic lens system and received by the light-receiving element is provided on the photographic lens side of the shutter mechanism.

In the lens shutter camera, as it is usually called, in which the shutter mechanism such as that of the so-called sector having an aperture stop function is disposed in the photographic lens system, the optical path for measurement along which the light beam emitted from the light-emitting element is traverses the object side of the sector of the photographic lens system and received by the light-receiving element is provided on the photographic lens side of the shutter mechanism, and thereby the light-blocking requirements can be fulfiled.

The camera possesses the function of readily accommodating changes in shape and refractive index of a synthetic resin lens involved in a temperature or humidity change to correct the shift of the imaging position and aperture stop means suitable for this function. This camera is provided with an imaging optical system including an optical element system which underdoes changes of shape and refractive index by variation in temperature or humidity and has a light-emitting element emitting infrared light, exclusive of visible light, and a light-receiving element which make at least one combination set. An arrangement is such that the light beam emitted from the light-emitting element is transmitted through at least one part of the imaging optical system and infrared transmitting means and is received by the light-receiving element. In this way, the camera has the function of predicting and compensating the shift of the imaging position by the changes of shape and refractive index of the imaging optical system from the output of the light-receiving element.

In this case, a common color film has no sensitivity to infrared light and hence, even though the light beam emitted from the light-emitting element reaches the film, the film is insensitive to the light. Thus, even when the light-emitting element is placed on the film side of the shutter mechanism like the sector and the optical path for measurement is provided along which the light beam emitted from the light-emitting element is transmitted through the photographic lens system and received by the light-receiving element, the light-blocking requirements can be fulfiled. Furthermore, by placing the optical path for measurement on each of the object and film sides of the shutter mechanism like the sector, the shift of the imaging position attributable to temperature or humidity can be presumed from the information of the entire photographing optical system.

In addition, the camera has means for blocking visible light and transmitting infrared light as well as means for allowing the passage of visible light on the optical path of a photographing optical system by a necessary amount during exposure (which is hereinafter referred to as "infrared transmitting means"), and the light beam emitted from the light-emitting element, after being transmitted through at least one part of the imaging optical system and the infrared transmitting means, is received by the light-receiving element. Thus, the visible light incident from the outside of the camera body on the photographic lens is blocked by the infrared transmitting means and does not reach the film. During exposure, the visible light incident from the outside of the camera body on the photographic lens reaches the film without being blocked by the infrared transmitting means, and the film is exposed to the light.

The means for allowing the passage of the visible light on the optical path of the photographing optical system by a necessary amount during photography, of the infrared transmitting means, may be such that the member of the sector is constructed with the infrared transmitting means to block the visible light and transmit the infrared light when the sector is closed, and to transmit the visible light by a required amount by properly opening the sector during exposure.

Alternatively, the sector may be constructed with the member having the properties that when a voltage is not applied, the visible light is blocked, while when the voltage is applied, the visible light is transmitted, so that the visible light is passed through the photographing optical system, under electrical control, by a required amount during exposure.

Moreover, the infrared transmitting means and the sector may be constructed independently of each other so that when measurements are made, the infrared transmitting means is brought to the state where the visible light is blocked and the infrared light is transmitted, while when the sector is opened for exposure, the infrared transmitting means is removed from the optical path, or the visible light is electrically transmitted to thereby control the sector and adjust the amount of exposure.

The embodiments of the optical apparatus according to the present invention will be explained in detail below with reference to the drawings.

First embodiment

In FIG. 1A, a beam of light emanating from an object surface 1, under circumstances of reference temperature or humidity, is incident on an optical element 2 which undergoes changes in shape and refractive index due to changes of temperature or humidity, and forms an image on a projection plane 3. At this time, a beam of light emitted from a light-emitting element for measurement 4 is transmitted through the optical element 2 and enters a light-receiving element for measurement 5. The centroid of the incident beam in this case is taken as a reference position 5a.

Figure 1B:
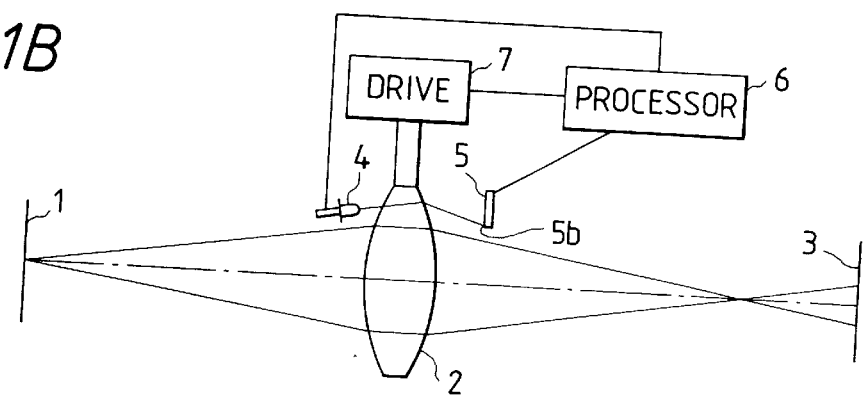
FIG. 1B is a view showing a case where an image on a photographic plane is out of focus because of variation of temperature or humidity.
Figure 1C:
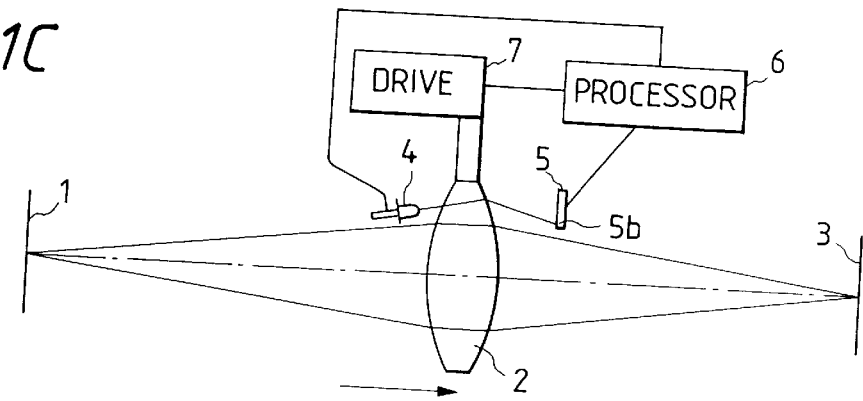
FIG. 1C is a view showing a case where the out-of-focus image of FIG. 1B is corrected by a lens drive.

Subsequently, in FIG. 1B showing the state of variation in temperature or humidity, the light beam emitted from the light-emitting element for measurement 4 is transmitted through the optical element 2 whose power has been changed by the variation of temperature or humidity, and is incident on a position 5b of the light-receiving element for measurement 5. An output from the light-receiving element for measurement 5 enters a processing means 6, which drives the optical element 2, through a driving means 7, in accordance with a predetermined amount calculated from the output of the light-receiving element for measurement 5. In this way, as shown in FIG. 1C, the light beam emanating from the object surface 1, under circumstances of temperature or humidity which deviate from a design reference, is incident on the optical element 2 whose power has been changed by the variation of temperature or humidity, and forms the image on the projection plane 3.

Also, in FIG. 1B, although the position of an object point on the object surface 1 and the position of the projection plane 3 remain unchanged, the image on the projection plane 3 brings about an out-of-focus state. This is because the focal length of an imaging optical system comprising the optical element 2 is changed by the variation of temperature or humidity, and the best position of the imaging plane is shifted.

The processing means 6 has the functions of presuming the change of the focal length of the imaging optical system from the positional relationship between the reference position 5a and the measured position 5b, computing the amount of movement of the imaging position, finding the position of the imaging optical system required for the coincidence between the best position of the imaging plane and the position of the projection plane, and generating a signal for commanding the driving means 7 to move the optical element 2.

Figure 2:
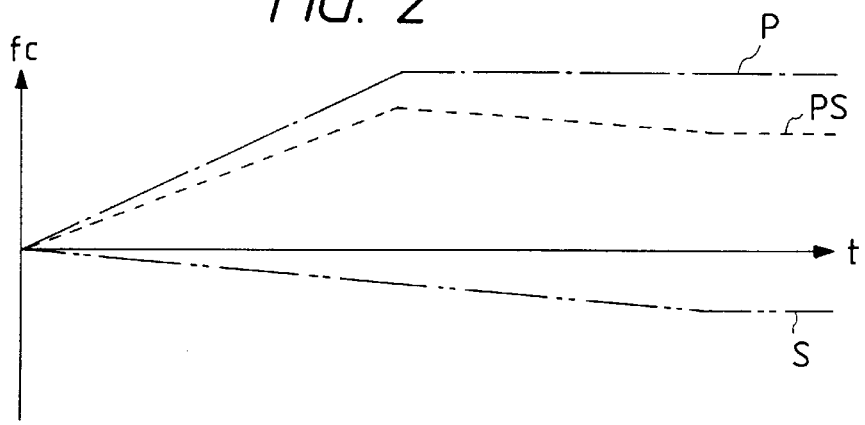
FIG. 2 is a graph showing the relationship between the focal length and the time when the temperature or humidity is changed.

FIG. 2 shows the relationship between a focal length fc and a time t when a lens constructed of synthetic resin, after being left for a sufficient time under circumstances of reference temperature or humidity, is placed under circumstances of different temperature or humidity. A chain line P represents a change by temperature, a dashed line PS represents a change by temperature and humidity, and a two-dashed chain line S represents a change by humidity. As seen from this graph, the influence of temperature, although it is not rapidly expanded, Is pronounced compared with that of humidity.

Next, reference is made to the mechanism In which the refractive index is increased and decreased by raising and lowering the temperature or humidity. If the temperature is raised, the shape of the synthetic resin lens will be expanded and the refractive index will be decreased, while if it is lowered, the shape of the synthetic resin lens will be contracted and the refractive index will be increased. For the influence of humidity, the synthetic resin lens undergoes this influence by absorbing or discharging moisture, and thus the focal length fc continues to vary some considerable time. As such, if the humidity is elevated, the shape of the synthetic resin lens will be expanded and the refractive index will be increased, while it is reduced, the shape of the synthetic resin lens will be contracted and the refractive index will be decreased.

The focal length fc is changed by the mechanism mentioned above and, as seen from FIG. 2, even when the synthetic resin lens is placed under circumstances of different temperature or humidity, the change of the focal length fc does not become uniform. Although the problem of such a complicated change with the passage of time cannot be met by a correcting way of making use of the thermometer or the expansion and contraction of material, the system of the present invention can completely accommodate this change because the change of the focal length of the optical system is directly presumed.

Figure 3:
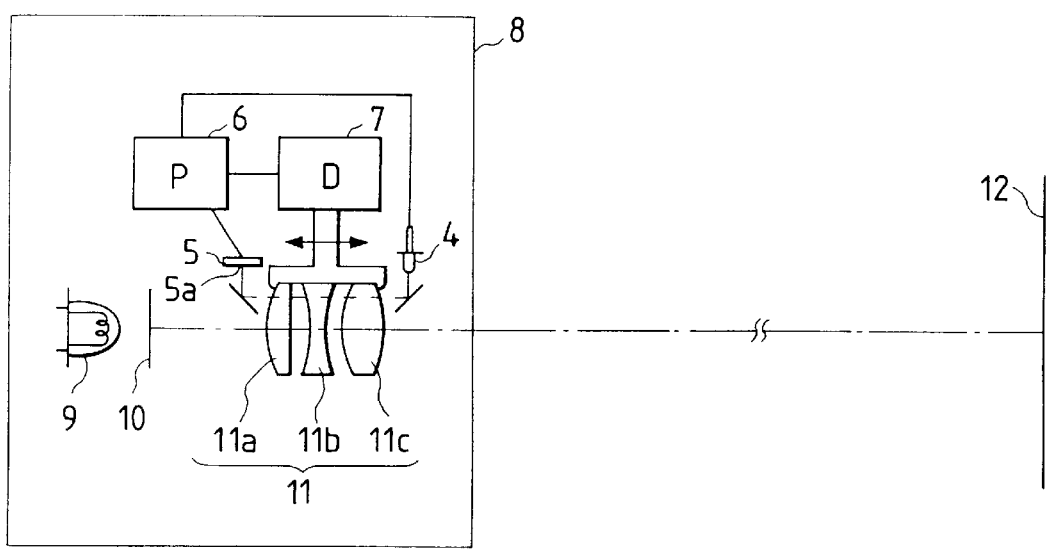
FIG. 3 is a view showing the arrangement where the optical apparatus of the first embodiment is applied to a slide projector.

In FIG. 3, a slide projector 8 is such that a slide 10 irradiated with light from a light source 9 is taken as an object surface, and the image of this is projected on a screen 12 by a projection lens system (imaging lens system) 11 including optical elements made of synthetic resin. The positional relationship between the slide 10 and the screen 12 remains unchanged during the projection.

When the projection is commenced, the position of the projection lens system 11 is adjusted and a focused image is projected on the screen 12. At this time, a beam of light is emitted from the light-emitting element 4, traverses the projection lens system 11, and is incident on the light-receiving element 5 to perform the setting of the reference position 5a. Subsequently, measurements are made, when the necessity arises, so that the information of the position of incidence of the light on the light-receiving element 5 is sent to the processing means 6, and a sharp image is always projected on the screen 12 through the lens driving means 7.

In particular, for the slide projector 8, the focal length of the synthetic resin lens system is liable to change because of heat generated by the light source 9. In the case of the optical system of FIG. 3 using two or more synthetic resin lenses, a lens 11a closer to the light source 9 is earlier subject to the influence of the heat from the light source 9 than lenses 11b and 11c farther therefrom. Although a change with the passage of time varies with each lens, the system of the present invention evaluates the entire lens system and thus there is no problem.

Furthermore, by placing the light-emitting element 4 on the screen side and the light-receiving element 5 on the slide side, an arrangement is such that the light beam from the light source 9 does not enter the light-receiving element 5. Thus, a substantial ratio of S/N can be increased, which is favorable.

Additionally, the optical path for measurement in the projection lens system 11 is provided on the one side of the optical axis of the projection lens system 11, and thereby precise measurements can be favorably made. In particular, when the arrangement is made so that the incident beam, or an approximate emergent beam, is rendered parallel to the optical axis of the projection lens system 11, accurate measurements become possible. Moreover, if the light beam for measurement is used as infrared light, the image formed with visible light on the screen will not be affected, which is favorable.

Second embodiment

Figure 4:
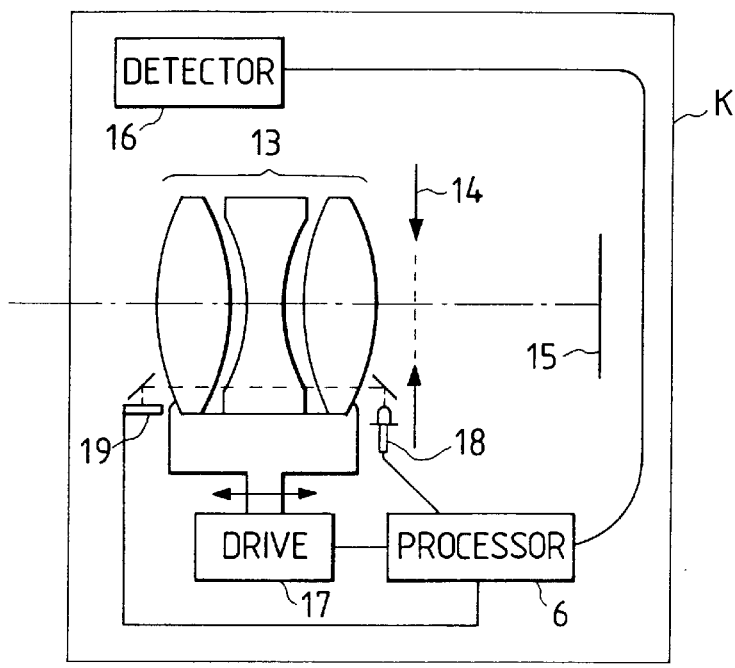
FIG. 4 is a view showing the arrangement where the optical apparatus of a second embodiment in the present invention is applied to a camera.

As shown in FIG. 4, a camera K of the optical apparatus according to this embodiment comprises a photographing optical system 13 including optical elements made of synthetic resin; a sector 14 having a stop function and a shutter function; a film surface 15; an auto-focus detecting means 16 for measuring an object distance to compute the lens shifting distance of the photographing optical system 13; a lens driving means 17 for shifting the photographing optical system 13; a light-emitting element for system measurement 18; a light-receiving element for system measurement 19; the processing means 6; a release switch, not shown; and a central processing means, not shown, for integrating these components.

Figure 5:
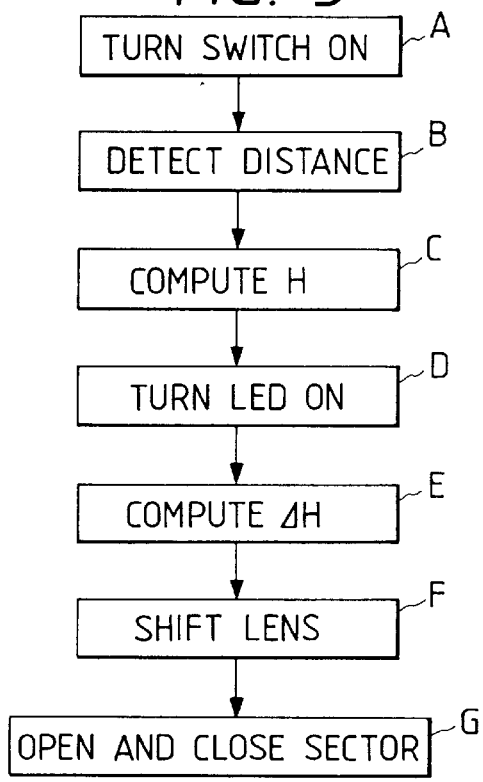
FIG. 5 is a flow chart showing the operation procedure of the camera in FIG. 4.

FIG. 5 is a flow chart showing the operation procedure of the camera of the second embodiment by which the film is exposed to the light from an object. When the release switch is turned on (Step A), the auto-focus detecting means 16 is actuated to measure the object distance (Step B), and a lens shifting distance 11 in a standard state is computed in accordance with the object distance (Step C). Further, light is emitted from the light-emitting element 18, passes through the photographing optical system 13 (Step D), is received by the light-receiving element 19, and is sent to the processing means 6 as a signal for a light-receiving position. In the processing means 6, the light-receiving position in the standard state which has been already stored is compared with the measured light-receiving position, the variation of the focal length of the photographing optical system 13 is presumed, a correction ΔH of a required lens shifting distance is computed, and a resulting signal is sent to the lens driving means 17 (Step E). Subsequently, the lens driving means 17 shifts the photographing optical system 13 by combining the lens shifting distance H derived from the auto-focus detecting means 16 and the correction ΔH from the processing means 6 (Step F). The sector 14 is opened, and after the light beam from the object is projected on the film by the photographing optical system 13 and the film is exposed to the light by a required amount, the sector 14 is closed (Step G). In this way, photography is completed.

Third embodiment

Figure 6:
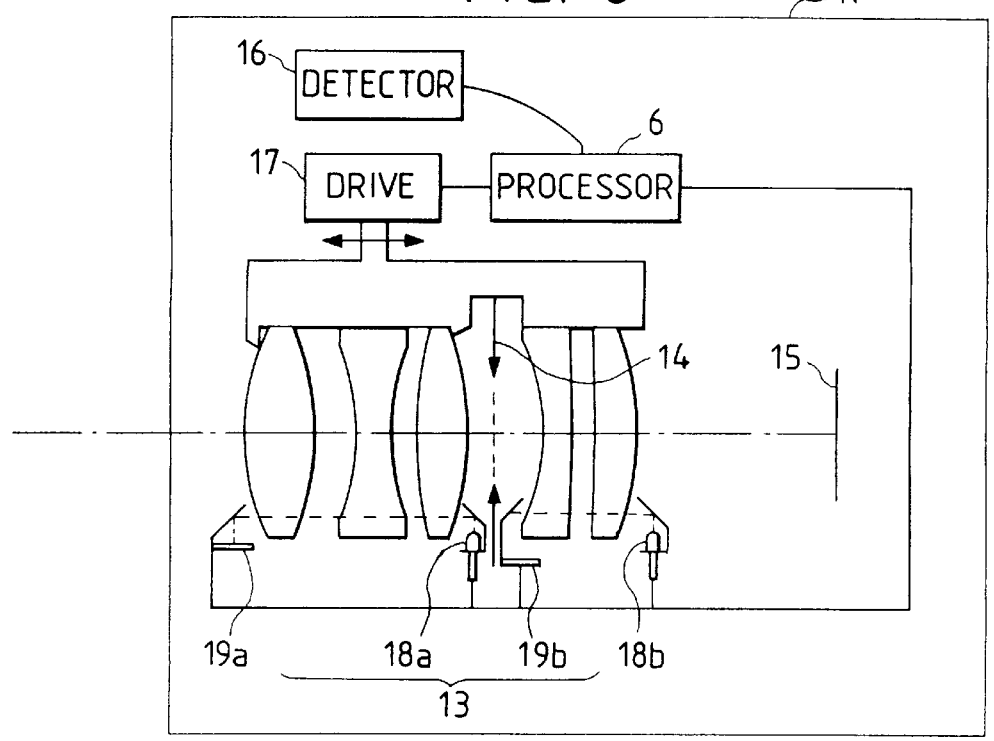
FIG. 6 is a view showing the arrangement where the optical apparatus of a third embodiment in the present invention is applied to a camera.

The camera K of the optical apparatus according to this embodiment, as shown in FIG. 6, comprises the photographing optical system 13 including optical elements made of synthetic resin; the sector 14 having a stop function and a shutter function; the film surface 15; the auto-focus detecting means 16 for measuring the object distance to compute the lens shifting distance of the photographing optical system 13; the lens driving means 17 for shifting the photographing optical system 13; light-emitting elements for system measurement 18a and 18b; light-receiving elements for system measurement 19a and 19b; the processing means 6; the release switch, not shown; and the central processing means, not shown, for integrating these components.

The sector 14 is interposed in the photographing optical system 13, and the optical elements made of synthetic resin are arranged on the object and image sides of the sector 14. The light-emitting element 18a and the light-receiving element 19a is placed on the object side of the sector 14, and the light-emitting element 18b and the light-receiving element 19b are placed on the image side thereof. The light-emitting element 18b is designed to emit light including not visible but infrared rays. For a film located at the film surface 15, a common color film which is sensitive to the visible light is used.

The operation procedure for exposing the film to the light from the object is similar to that of the second embodiment shown in FIG. 5. Specifically, when the release switch is turned on (Step A), the auto-focus detecting means 16 is actuated to measure the object distance (Step B), and the lens shifting distance H in the standard state is computed in accordance with the object distance (Step C). Further, light is emitted from the light-emitting element 18a, passes through the photographing optical system 13 on the object side of the sector 14, is received by the light-receiving element 19a, and is sent to the processing means 6 as a signal for a light-receiving position. Additionally, light is emitted from the light-emitting element 18b, passes through the photographing optical system 13 on the image side of the sector 14, is received by the light-receiving element 19b, and is sent to the processing means 6 as a signal for a light-receiving position (Step D). The processing means 6 compares the light-receiving position in the standard state which has been already stored, with the measured light-receiving position, presumes the variation of the focal length of the photographing optical system 13, computes the correction ΔH of the required lens shifting distance, and sends the resulting signal to the lens driving means 17 (Step E). Subsequently, the lens driving means 17 shifts the photographing optical system 13 by combining the lens shifting distance H derived from the auto-focus detecting means 16 and the correction ΔH from the processing means 6 (Step F). The sector 14 is opened, and after the light beam from the object is projected on the film by the photographing optical system 13 and the film is exposed to the light by a required amount, the sector 14 is closed (Step G). In this way, photography is completed.

Fourth embodiment

Figure 7:
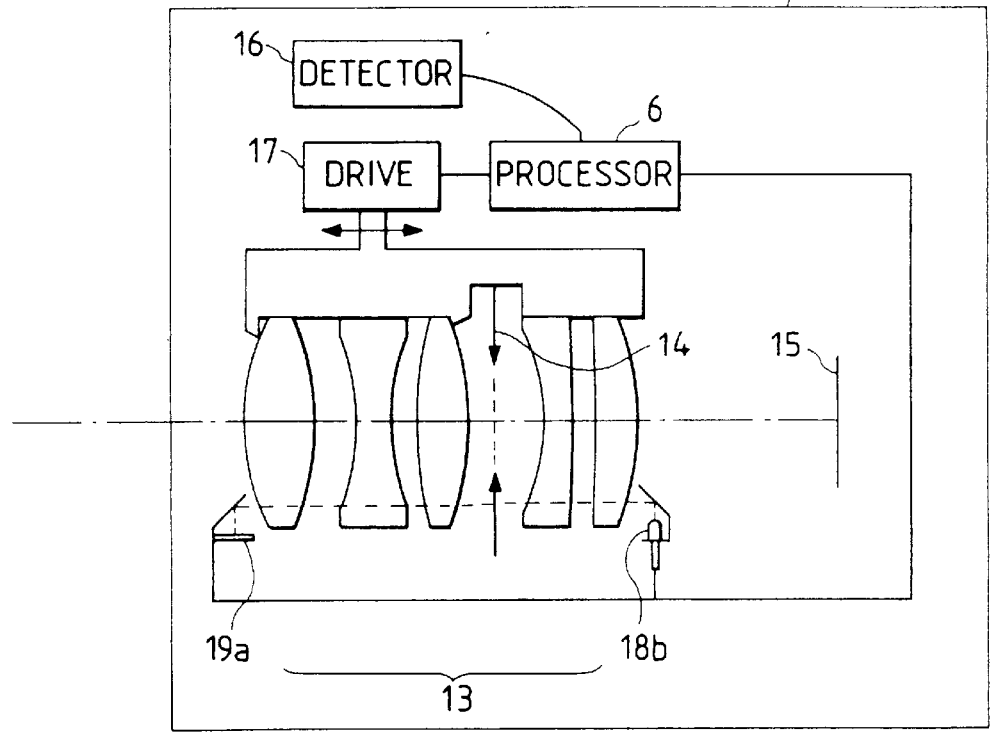
FIG. 7 is a view showing the arrangement where the optical apparatus of a fourth embodiment in the present invention is applied to a camera.

The camera K of the optical apparatus according to this embodiment, as depicted in FIG. 7, is constructed with the photographing optical system 13 including optical elements made of synthetic resin; the sector 14 having a stop function and a shutter function; the film surface 15; the auto-focus detecting means 16 for measuring the object distance to compute the lens shifting distance of the photographing optical system 13; the lens driving means 17 for shifting the photographing optical system 13; the light-emitting element for system measurement 18b; the light-receiving element for system measurement 19a; the processing means 6; the release switch, not shown; and the central processing means, not shown, for integrating these components. The sector 14 is interposed in the photographing optical system 13, and the optical elements made of synthetic resin are arranged on the object and image sides of the sector 14. The sector 14 is constructed of an infrared transmitting member by which visible light is blocked and infrared light is transmitted. The light-emitting element 18b is designed to emit light including infrared rays as in an LED. For the film located at the film surface 15, a common color film which is sensitive to visible light is used.

The operation procedure for exposing the film to the light from the object is similar to that of the second embodiment shown in FIG. 5. Specifically, when the release switch is turned on (Step A), the auto-focus detecting means 16 is actuated to measure the object distance (Step B), and the lens shifting distance H in the standard state is computed in accordance with the object distance (Step C). Further, light is emitted from the light-emitting element 18b, passes through the photographing optical system 13 and the sector 14, is received by the light-receiving element 19a, and is sent to the processing means 6 as a signal for a light-receiving position. In this case, the visible light from the object is blocked by the sector 14 and thus the film is not exposed to the light. The processing means 6 compares the light-receiving position in the standard state which has been already stored, with the measured light-receiving position (Step D), presumes the variation of the focal length of the photographing optical system 13, computes the correction ΔH of the required lens shifting distance, and sends the resulting signal to the lens driving means 17 (Step E). Subsequently, the lens driving means 17 shifts the photographing optical system 13 by combining the lens shifting distance H derived from the auto-focus detecting means 16 and the correction ΔH from the processing means 6 (Step F). The sector 14 is opened, and after the light beam from the object is projected on the film by the photographing optical system 13 and the film is exposed to the light by a required amount, the sector 14 is closed (Step G). In this way, photography is completed.

What is claimed is:

1. A camera comprising:
    a photographing optical system including an optical element system which undergoes changes in shape and refractive index by temperature or humidity;
    at least one set of a light-emitting element and a light-receiving element, said light-emitting element being placed so that a beam of light emitted therefrom is transmitted through at least one part of said photographing optical system and is received by said light-receiving element;
    a processing means for processing an output from said light-receiving element;
    a drive mechanism disposed proximate to said photographing optical system, said drive mechanism providing compensation for a shift of an imaging position caused by the changes in shape and refractive index of said optical element system in accordance with an output of said processing means;
    a means for passing a required amount of visible light on a photographing optical path through said photographing optical system during exposure; and
    a means for intercepting the visible light and transmitting infrared light.

2. A camera comprising:
    an imaging optical system including an optical element system which undergoes changes in shape and refractive index by temperature or humidity;
    at least one set of a light-emitting element and a light-receiving element, said light-emitting element being constructed to emit infrared light free from visible rays and being placed so that a beam of light emitted therefrom is transmitted through at least one part of said imaging optical system and is received by said light-receiving element;

a control system of said imaging optical system, said control system being constructed and arranged to derive a shift of an imaging position caused by the changes in shape and refractive index of said optical element system from an output of said light-receiving element and to behave for compensation for the shift of the imaging position;

a means for passing a required amount of visible light on an imaging optical path through said imaging optical system during exposure; and a means for intercepting the visible light and transmitting the infrared light.

3. A camera according to claim 1, wherein a shutter member of said photographing optical system constitutes said means for passing a required amount of visible light on a photographing optical path through said photographing optical system during exposure and said means for intercepting the visible light and transmitting infrared light.

4. A camera according to claim 2, wherein a shutter member of said imaging optical system constitutes said means for passing a required amount of visible light on an imaging optical path through said imaging optical system during exposure and said means for intercepting the visible light and transmitting the infrared light.

5. A camera according to any one of claims 1 or 3, further comprising:

an automatic focus detecting means for measuring an object distance and computing therefrom an amount of displacement of said photographing optical system required for focusing, wherein said drive means displaces said photographing optical system by a resultant amount composed of said amount of focusing obtained by said focus detecting means and an amount for compensation indicated by said output of said processing means.

6. A camera according to any one of claims 2 or 4, further comprising:

an automatic focus detecting means for measuring an object distance and computing therefrom an amount of displacement of said imaging optical system required for focusing, wherein said control system displaces said imaging optical system by a resultant amount composed of said amount for focusing obtained by said focus detecting means and an amount for compensation derived from said output of said light-receiving element.

7. A camera according to claim 5, wherein said optical element system includes optical elements, at least one part of which are constructed of synthetic resin.

8. A camera according to claim 6, wherein said optical element system includes optical elements, at least one part of which are constructed of synthetic resin.

9. A camera according to any one of claims 1, 2, 3, or 4, wherein said optical element system includes optical elements, at least one part of which are constructed of synthetic resin.

* * * * *